United States Patent [19]
Knowles

[11] Patent Number: 5,190,356
[45] Date of Patent: Mar. 2, 1993

[54] AND-TYPE CONTROL VALVE FOR A TRACTOR-TRAILER BRAKING SYSTEM

[75] Inventor: James G. Knowles, Welton, United Kingdom

[73] Assignee: Wabco Automotive U.K. Limited, Rugby, England

[21] Appl. No.: 791,686

[22] Filed: Nov. 14, 1991

Related U.S. Application Data

[63] Continuation of Ser. No. 371,952, Jun. 27, 1989, abandoned.

[30] Foreign Application Priority Data

Jul. 1, 1988 [GB] United Kingdom ............... 8815703

[51] Int. Cl.$^5$ ............................................ B60T 11/20
[52] U.S. Cl. ....................................... 303/7; 137/111; 137/112; 188/3 H; 188/16; 188/354; 303/9.61; 303/84.1; 235/201 ME
[58] Field of Search ................... 137/803–842, 137/111, 114, 112, 533.21, 625.66, 885; 303/84.1, 84.2, 6.01, 7, 9.61, 13–18; 188/151 A, 354, 16, 3 R, 3 H; 235/201 ME, 201 PF, 201 R

[56] References Cited

U.S. PATENT DOCUMENTS

| | | |
|---|---|---|
| 1,409,116 | 3/1922 | Sammis . |
| 2,354,791 | 8/1944 | Boldt . |
| 2,395,941 | 3/1946 | Rockwell . |
| 2,847,182 | 8/1958 | Mancusi, Jr. . |
| 3,168,898 | 2/1965 | Samet ............... 137/829 X |
| 3,338,257 | 8/1967 | Ferguson . |
| 3,500,853 | 3/1970 | Freeman ............ 137/829 X |
| 3,785,403 | 1/1974 | Kirk . |
| 3,889,711 | 6/1975 | Hirao . |
| 3,995,654 | 12/1976 | Arvin et al. . |
| 4,205,700 | 6/1980 | Bouteille et al. . |
| 4,253,481 | 3/1981 | Sarlls, Jr. . |
| 4,261,381 | 4/1981 | Geiling . |

FOREIGN PATENT DOCUMENTS

| | | |
|---|---|---|
| 0030883 | 6/1981 | European Pat. Off. . |
| 0057640 | 8/1982 | European Pat. Off. . |
| 0110289 | 6/1984 | European Pat. Off. . |
| 1028404 | 10/1958 | Fed. Rep. of Germany . |
| 2004567 | 8/1971 | Fed. Rep. of Germany ...... 137/829 |
| 2262036 | 7/1974 | Fed. Rep. of Germany . |
| 2359022 | 7/1978 | Fed. Rep. of Germany . |
| 2493781 | 11/1980 | France . |
| 48274 | 4/1965 | German Democratic Rep. . |
| 341900 | 1/1972 | Sweden . |
| 393672 | 5/1977 | Sweden . |
| 631693 | 5/1978 | U.S.S.R. . |
| 1000620 | 3/1983 | U.S.S.R. . |
| 685203 | 12/1952 | United Kingdom . |
| 2089917 | 6/1982 | United Kingdom . |
| 2096258 | 10/1982 | United Kingdom . |
| 2153937 | 8/1985 | United Kingdom . |

Primary Examiner—Douglas C. Butler
Attorney, Agent, or Firm—Blum Kaplan

[57] ABSTRACT

An AND-type control valve useful in a vehicle braking system to prevent application of the vehicle brakes when only the right-hand or left-hand vehicle brakes are applied for the purpose of steering the vehicle. The control valve has two input flowpaths corresponding to the hydraulic braking circuit on different sides of the vehicle and a control output port for connection to the vehicle brake valve. Each input flowpath contains a non-return valve having associated therewith a flow sensitive device to provide a restricted flowpath which gives rise to a pressure drop which will tend to close or assist in closure of the non-return valve. A device is provided to prevent simultaneous closure of both non-return valves.

22 Claims, 3 Drawing Sheets

AND-TYPE CONTROL VALVE FOR A TRACTOR-TRAILER BRAKING SYSTEM

This is a continuation of application Ser. No. 07/371,952, filed on Jun. 27, 1989, now abandoned.

FIELD OF THE INVENTION

The present invention relates, in general, to control valves and, more particularly, this invention relates to an AND-type control valve which, although not limited thereto or thereby, is particularly useful in the controlling of the operation of a trailer brake valve in a master cylinder-type vehicle braking system which includes dual fluid pressure operated circuits so that the brakes on one side of the vehicle can be actuated independently of the brakes on the other side of such vehicle so that enhanced steering capability on such vehicle can be achieved.

BACKGROUND OF THE INVENTION

As is generally well recognized in the vehicle art, numerous vehicles utilized in the construction, mining and agricultural industries employ dual hydraulic braking circuits. A first of these braking circuits controls the brakes on the left-hand side of the vehicle and a second of these braking circuit controls the brakes on the right-hand side of such vehicle. These separate braking circuits are used in these vehicles for the purpose of steering or at least providing the operator assistance in steering such vehicle.

In some cases, these braking circuits may be rather high pressure circuits. Such high pressure circuits are usually supplied fluid pressure by a pump and/or hydraulic accumulator arrangement. In certain other cases, such as found in many of the agricultural vehicles presently in use, such braking circuits may consist of a relatively simple master cylinder/slave cylinder-type arrangement. In this latter case, it is generally the practice to utilize two independently operated master cylinders. In this case, each of the master cylinders is operated by its own separate brake pedal and controls its own brake circuit on a particular side of a vehicle. Therefore, these particular vehicles must be equipped with two brake pedals. Consequently, for the purpose of making a braking application on these vehicles, these two brake pedals are coupled together so that they will work in unison. On the other hand, for the purpose of steering, or providing assistance in the steering of such vehicle, these two brake pedals must be uncoupled and operated separately by the vehicle operator.

When these vehicles ar equipped with a trailer brake valve, which is operated by the vehicle's own brakes, it is the most desirable arrangement to have the trailer brake valve to operate only when the vehicle brakes are being used for the purpose of braking the vehicle. In other words, such trailer brake valve should not operate when the vehicle brakes are being used for the purpose of steering the vehicle. Therefore, as such, it is then necessary for such trailer brake valve to operate only when both the right-hand and left-hand brake circuits are in a pressurized condition.

Such a trailer brake valve, which uses control logic terms, is generally recognized in the valve art as an "AND" type trailer brake valve. Prior to the present invention, a number of different forms of "AND" type control logic valves have been both taught in the prior art and used in vehicle braking systems. One such well known AND-type control logic valve includes a pair of opposing non-return valves which have a push rod interspaced between them. This push rod has a sufficient length so that when either one of these non-return valves is in a seated position, i. e., a closed position, the other non-return valve will be held in an open position by such push rod. A quite similar type AND-type control valve can be constructed, however, without requiring the use of such push rod. In this latter AND-type control logic valve, there is a pair of opposing poppet elements. These poppet elements are either extended on their seats or are placed so close together that they will prevent both poppet elements from closing at substantially the sam time. In each case, however, the poppet element is made to close by the action of fluid pressure through the circumferential area between such poppet element and the seat. Therefore, the AND-type control valve is constructed to ensure that the fluid flow through this circumferential area is not too large. Consequently, this means that such circumferential area must be kept rather small. However, for master cylinder-type braking systems presently in use, the fluid flow required to close this AND-type logic valve represents a leakage flow and increased brake pedal travel and, therefore, must be kept to a minimum. In order to accomplish this, the circumferential area must be controlled to extremely tight tolerances. Such tight tolerances are unacceptable because they add significantly to both the rejection rate and the manufacturing cost of such AND-type control logic valve.

SUMMARY OF THE INVENTION

The present invention provides an improved AND-type control valve. This AND-type control valve includes a control output port and a pair of flow input flowpaths. Each of such flow input flowpaths are in fluid communication with such control outlet port. This fluid communication between such control output port and such pair of flow input flowpaths is established and controlled by means of a non-return valve associated with each such flow input flowpath. Such non-return valves are arranged in a manner such that each of them cannot be closed at the same time and each of these non-return valves has a flow sensitive means associated therewith.

This invention also provides a dual circuit vehicle braking system. This dual circuit braking system comprises a separate hydraulic circuit that is positionable on such vehicle for controlling, respectively, brakes for the left-hand side and the right-hand side of such vehicle. Likewise, positionable on such vehicle is an AND-type control valve. This AND-type control valve includes a housing in which a control output port is formed. Two flow input flowpaths are connected for fluid communication with this control output port. A first one of these flow input flowpaths is connected to supply fluid pressure to a hydraulic brake circuit o the left-hand side of such vehicle and a second one of such flow input flowpaths is connected to supply fluid pressure to a hydraulic brake circuit on the right-hand side of such vehicle. A non-return valve is associated with and positioned in each one of such two flow input flowpaths. Each such non-return valve being arranged such that both cannot be closed at substantially the same time. Such AND-type control valve further includes a flow sensitive means associated with each of the non-return valves. These flow sensitive means assist in a closure of an associated one of such non-return valves.

OBJECTS OF THE INVENTION

It is, therefore, one of the primary objects of the present invention to provide an improved AND-type control valve which will substantially minimize the close manufacturing tolerances which are required in the prior art-type control valves of the AND-type.

Another object of the present invention is to provide an AND-type control valve which is particularly useful in a dual circuit-type braking system.

Still another object of the present invention is to provide an AND-type control valve which can be manufactured at a relatively low cost and from a variety of materials.

An additional object of the present invention is to provide an AND-type control valve in which the sensitivity can be rather easily controlled during the manufacturing process.

In addition to the various objects and advantages of the improved AND-type control valve of the present invention, which have been described above, various other objects and advantages of such invention will become more readily apparent to those persons who are skilled in the vehicle control valve art from the following more detailed description of such AND-type control valve when such description is taken in conjunction with the attached drawing Figures and with the appended claims.

BRIEF DESCRIPTION OF THE INVENTION

Figure 1:
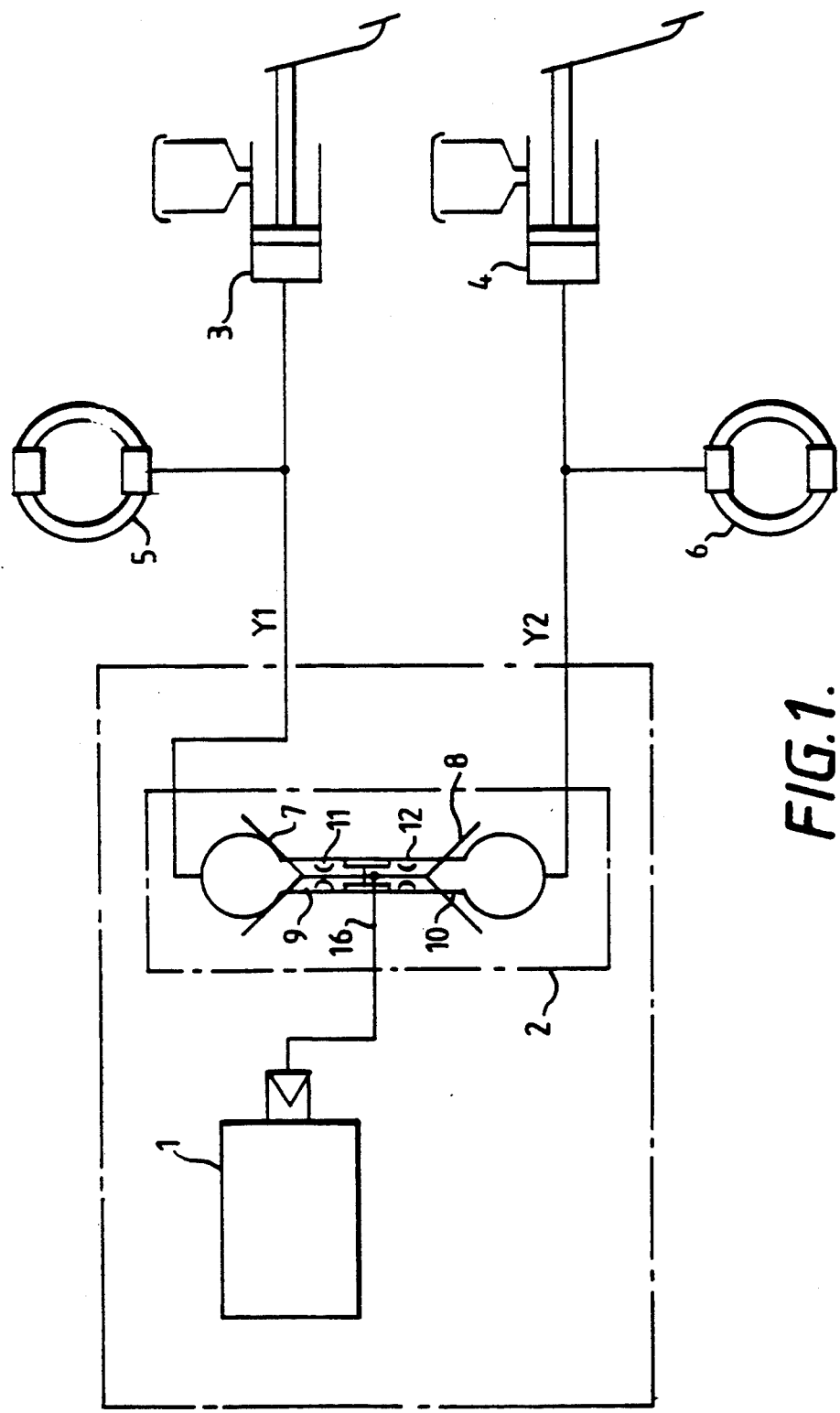
FIG. 1 is a schematic circuit diagram for a trailer braking system having incorporated therein an AND-type control valve that is constructed according to one of the presently preferred embodiments of the present invention.

Prior to proceeding to a considerably more detailed description of the various embodiments of the present invention, it should be noted that in such description, identical components of the AND-type control valve which have identical functions have been identified with identical reference numerals throughout the several views which have been illustrated in the attached drawings.

As the description of the present invention proceeds, it will become clear to persons skilled in the control valve art that, according to the present invention, there is provided an AND-type control valve which includes a control output port and a pair of input flowpaths for, respectively, communicating and receiving fluid pressure. Each of such input flowpaths is in fluid communication with such output port via a non-return valve. These non-return valves are arranged in a manner such that they both cannot be in an open position at the same point in time. Each of the non-return valves has associated therewith a means which is rather sensitive to fluid flow. These flow sensitive means are provided to assist in the closure of a respective non-return valve associated with a respective flow sensitive means.

Each such flow sensitive means is preferably a piston which is positioned for reciprocal movement within a bore formed in the housing member of such AND-type control valve. In this embodiment of the invention, the piston includes an orifice incorporated therein which enables a relatively small flow of fluid passing across or along such orifice to give rise to a pressure drop. This pressure drop imparts a linear motion to the piston which thus acts to close the associated non-return valve.

In one embodiment of this invention, the non-return valve is a poppet valve element. It is preferred that this poppet valve element be formed integral with the piston. This poppet valve element is positioned in a bore formed in such housing concentric with the valve seat. When each of the pistons are downstream of the associated poppet valve element, such pistons are opposed and in abutting engagement so as to ensure that when one non-return valve is in a closed position, the other non-return valve will be held in an open position.

In an alternative embodiment of this invention, the pistons and their respective orifices can be positioned upstream of the poppet seats. In this alternative arrangement, the pressure drop that occurs across the piston will cause a pushing force to close the poppet, instead of a pulling force. In this manner, the piston and the poppet could be manufactured as separate components if it was found to be advantageous for a particular method used in the manufacture of such AND-type control valve. For example, in this alternative embodiment, the poppet seat and the piston bore would not have to be concentric. In addition, the poppet could then be replaced by a ball.

The present invention includes a tractor-trailer braking system including separate hydraulic brake circuits which control, respectively, the brakes for the left-hand side and the right-hand side of the vehicle. In this arrangement, a trailer brake valve is provided. The trailer brake valve is responsive to a control signal from the outlet port of the AND-type control valve constructed according to the present invention. One of the input flowpaths of such AND-type control valve is connected to the left-hand hydraulic brake circuit and the other input flowpath is connected to the right-hand hydraulic brake circuit.

One presently preferred embodiment of the invention will now be described with particular reference to FIG. 1 of the drawings. The circuit illustrated in FIG. 1 includes a trailer brake valve 1 and an AND-type control valve 2, or head. The AND-type control valve 2 is equipped with two input ports Y1 and Y2. These inputs Y1 and Y2 are supplied with fluid from the hydraulic master cylinders 3 and 4, respectively. The hydraulic master cylinders 3 and 4 are also connected to the vehicle brakes 5 and 6, respectively. In this case, the vehicle is an agricultural tractor. The AND-type control valve 2, or head, has two opposing non-return valves 7 and 8. The non-return valves 7 and 8 include pistons 9 and 10, respectively, which preferably are formed integrally therewith. The pistons 9 and 10 have a length at least sufficient to prevent both non-return valves 7 and 8 from closing at the same time. In addition, each of the pistons 9 and 10 has an orifice 11 and 12, respectively, incorporated therein. Located intermediate the two non-return valves 7 and 8 is a fluid communication passageway 16. Such fluid communication passageway 16 leads to the trailer brake valve 1. When pressurized, the trailer brake valve 1 will operate to produce a proportionally higher fluid pressure at the vehicle brakes 5 and 6.

During operation, for example, if the fluid pressure is raised in the master cylinder 3 only, for the purpose of steering the tractor, say to the right, then the right-hand brake 5 of the tractor will operate and input port Y1 will be pressurized. In this case, if the non-return valve 7 is already in a closed position, then the trailer brake valve 1 will not operate. If, however, the non-return valve 7 is an open position, then a relatively small flow of fluid will pass across the orifices 11 and 12 and through the non-return valve 8 where such fluid may be returned to the non-pressurized master cylinder 4 and to the normally common reservoir (not shown). The pressure that is required to operate the non-return valve 8 will generally be very low. This pressure will be insufficient, for example, to operate the trailer brake valve 1 by way of fluid communication passageway 16. In addition, the fluid flow throughout the orifices 11 and 12 will create a pressure drop across the pistons 9 and 10. Such pressure drop across the piston 9 and 10 will further open the non-return valve 8 and close the non-return valve 7. This action will prevent further fluid flow leaking from the master cylinder 3 to the master cylinder 4. Because the flow required to close the non-return valve 7 is determined by the size of the orifice 11, the circumferential area formed by the poppet opening can be relatively large. This circumstance substantially eliminates the necessity of having tight tolerances with respect to the poppet lift. In addition, the fluid flow can be made to be extremely small.

Similarly, if the fluid pressure is raised in the master cylinder 4 only, then the left-hand tractor brake will be applied. In this case, the vehicle will steer, or be assisted in steering, to the left. Furthermore, fluid pressure will be applied to the input port Y2 of the AND-type control valve 2, and the non-return valve 8 will be either closed or made to close as described above. In this case, the trailer brake valve 1 will still not operate.

On the other hand, if the brake pedals associated with master cylinders 3 and 4 are coupled together, then depressing either brake pedal will raise the pressure in both master cylinders 3 and 4 simultaneously and both tractor brakes 5 and 6 will be applied at the same time. Since it is generally customary for most dual brake circuits to be equipped with some means (not shown) of equalizing the pressure in the two circuits when both fluid communication lines are pressurized, then the tractor will normally be retarded in a substantially straight line. That is, the tractor will not be steered either to the right or to the left. In addition, in the case where the brake pedals are coupled together, the fluid pressure will be applied to both of the input ports Y1 and Y2 substantially simultaneously. Since both non-return valves 7 and 8 cannot be closed at the same time, pressure will be transmitted through the open one of such non-return valves 7 and 8 to the fluid communication passageway 16. In this case, sufficient pressure will be communicated to the trailer brake valve 1 to cause it to operate. Therefore, according to the present invention, the trailer brake valve 1 only operates when both brake lines are pressurized. That is, when the brake pedals associated with the tractor brakes 5 and 6 are coupled together and operate for the purpose of retarding the vehicle. On the other hand, the trailer brake valve 1 will not operate when only one of such tractor brakes 5 and 6 is applied for the purpose of steering or assisting in the steering of such vehicle.

Figure 2:
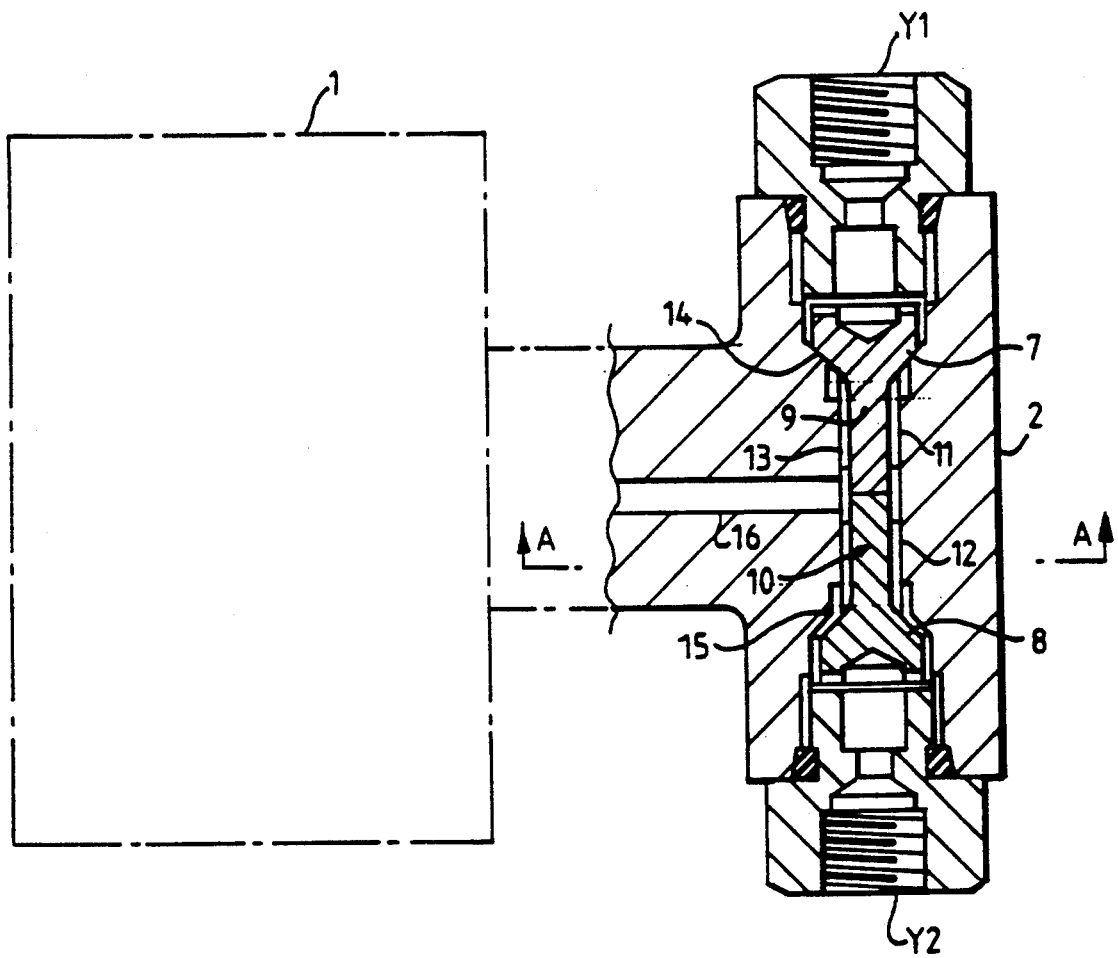
FIG. 2 is a cross-sectional view which illustrates a presently preferred embodiment of an AND-type control valve.
Figure 3:
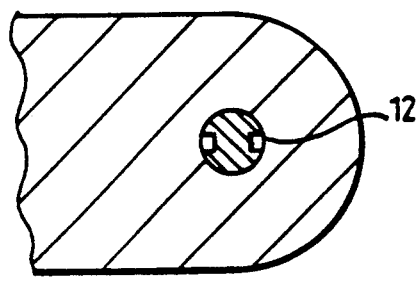
FIG. 3 is another cross-sectional view which is taken along lines A—A of FIG. 2 to illustrate one presently preferred means for providing improved sensitivity to such AND-type control valve.

Now, refer more particularly to FIGS. 2 and 3. Illustrated in FIG. 2 is one presently preferred embodiment of the dual input AND-type control valve 2, or head, which is connected to the trailer brake valve 1 by a pair of bolts (not shown).

This AND-type control valve 2 includes a bore 13 formed through the housing. Adjacent the opposing ends of the bore 13 are concentric cone seats 14 and 15. Slidably engaged within the bore 13 are two poppet-type non-return valves 7 and 8. Each of these poppet-type non-return valves 7 and 8 includes an integral piston 9 and 10, respectively. The pistons 9 and 10 contain two diametrically axial grooves. When such axial grooves are positioned in the bore 13, they form orifices 11 and 12, respectively, in the pistons 9 and 10. The combined overall lengths of the pistons 9 and 10 is such that only one of the poppet-type non-return valves 7 and 8 can be closed against its corresponding seats 14 and 15, respectively, at the same time. It is presently preferred that the end of each piston 9 and 10 have a reduced portion to enable flow communication with a fluid communication passageway 16 connected at one end thereof for fluid communication with the bore 13 intermediate such ends of such bore 13. Such fluid communication passageway 16 being connectable at an opposite end thereof with a trailer brake valve 1.

In the presently preferred embodiment of the invention, the AND-type control valve 2 functions as previously described with each poppet-type non-return valve 7 and 8, in the steering mode, either being closed or made to close by the action of the fluid being communicated through its corresponding orifice 11 and 12. Such orifices 11 and 12 are preferably a long and slender orifice 11 and 12 because they will increase the flow sensitivity. However, it is within the scope of the present invention for such orifices 11 and 12 to include sharp edges and to be positioned within the bore 13 of such AND-type control valve 2 either radially or axially.

It is further within the scope of the present invention for such poppet-type non-return valves 7 and 8 to be manufactured from a variety of materials either with or without an elastomeric seal. However, the presently preferred design utilizes an injection molded plastic poppet-type non-return valve 7 and 8. The plastic used must have sufficient resilience, tensile strength, temperature and creep resistance, etc., to enable a 100% leak-free seal to be obtained at the extremes of temperature and pressure imposed by a particular tractor braking system. Injection molded plastic poppet-type non-return valves 7 and 8 have a number of significant advantages in their use. These advantages include, for example, light weight and low friction. Such light weight and low friction further increasing the sensitivity to fluid flow of the AND-type control valve 2. Of even more significance is the fact that such injection molded plastic poppet-type non-return valves 7 and 8 are more economical to produce. Such economy in production results from lower material cost and because no machining is required on such plastic poppet-type non-return valves 7 and 8.

Figure 4:
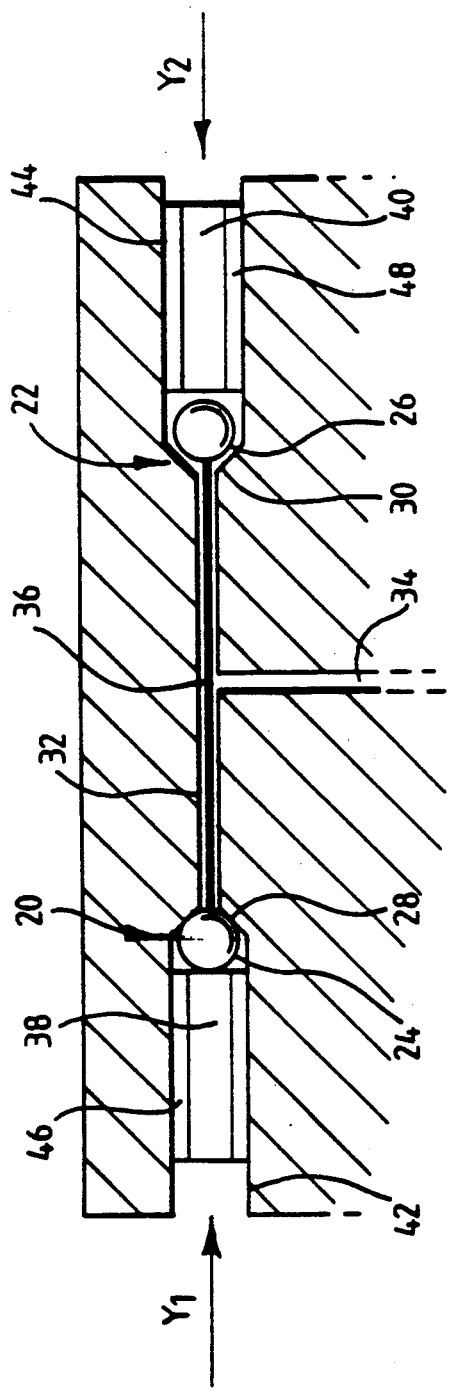
FIG. 4 is a fragmented schematic illustration, in cross-section, of an alternative embodiment of an AND-type control valve constructed according to the present invention.

Now refer more particularly to FIG. 4. Illustrated in FIG. 4 is one alternative embodiment of the AND-type control valve in which the axially opposed non-return valves, generally designated 20 and 22, are formed by balls 24 and 26 which are positioned to cooperate, respectively, with conical seats 28 and 30. A fluid communication passageway 32 is provided to enable fluid communication between the conical seats 28 and 30 and another fluid communication passageway 34. Such fluid communication passageway 34 is connected to the output port (not shown) of such AND-type control valve. The fluid communication passageway 32 contains a push rod-like member 36 positioned for reciprocal axial movement therein. The push rod-like member 36 has a length such that when one ball (illustrated in FIG. 4 as 24) is seated, the push rod-like member 36 lifts the other ball (illustrated in FIG. 4 as ball 26) from its seat. In this manner, the pair of non-return valves 20 and 22 cannot be open at substantially the same time. The pistons 38 and 40 are disposed, respectively, in the bores 42 and 44 upstream of an associated non-return valve 20 and 22, respectively. Such pistons 38 and 40 are located in the input flowpath from input ports Y1 and Y2 so that the resistance to flow along the orifices 46 and 48 will create a pressure drop. This pressure drop causing movement of one of such pistons 38 and 40 to push one of the associated balls 24 and 26 into a respective seat 28 and 30.

Although a number of embodiments of the AND-type control valve, constructed according to the present invention, have been described in considerable detail above, it should be obvious to those persons who are skilled in the control valve art that various other modifications and adaptations of such AND-type control valve can be envisioned without departing from the spirit and scope of the appended claims.

I claim:

1. An AND-type control valve for a tractor-trailer braking system, comprising a housing having an outlet port formed therein, said housing including a first input flowpath coupled for fluid communication with said outlet port, a second input flowpath coupled for fluid communication with said outlet port, said outlet port being in fluid communication with at least one of said first and second input flowpaths only when both of said first and second input flowpaths are pressurized, a first non-return valve having a portion displaceable in said first input flowpath between open and closed positions, said first non-return valve defining a first open area therethrough and including first flow sensitive means for assisting in displacing said portion of said first non-return valve to said closed position thereof, a second non-return valve having a portion displaceable in said second input flowpath between open and closed positions, said second non-return valve defining a second open area therethrough and including second flow sensitive means for assisting in displacing said portion of said second non-return valve to said closed position thereof, said first flow sensitive means and said second flow sensitive means respectively including first and second piston means defining first and second orifices, respectively, said first orifice having an area less than said first open area and said second orifice having an area less than said second open area, said first non-return valve and said second non-return valve being operatively arranged such that both respective portions thereof cannot be displaced to their respective closed positions substantially simultaneously.

2. The AND-type control valve as claimed in claim 1, wherein said first input flowpath includes a first bore therein, said first piston means including a first piston positioned for reciprocal movement within said first bore, said second input flowpath including a second bore therein, said second piston means including a second piston positioned for reciprocal movement with in said second bore, said first piston having said first orifice defining a restricted flowpath therethrough, said first non-return valve being responsive to travel of said first piston, and said second piston having said second orifice defining a restricted flowpath therethrough, said second non-return valve being responsive to travel of said second piston.

3. The AND-type control valve as claimed in claim 2, wherein said first non-return valve includes a first valve element formed integrally with said first piston an positioned in said first bore, said first bore including a first valve seat therein concentric with said first bore and associated with said first valve element, and said second non-return valve including a second valve element formed integrally with said second piston and positioned in said second bore, said second bore including a second valve seat therein concentric with said second bore and associated with said second valve element.

4. The AND-type control valve as claimed in claim 3, wherein said first and second non-return valves are poppet-type non-return valves.

5. The AND-type control valve as claimed in claim 4, wherein said first and second pistons are disposed downstream, respectively, of said first and second non-return valves, said first and second pistons being opposed and in abutting engagement so that when one of said first and second non-return valves is closed, the other of said first and second non-return valves is at least partially open.

6. The AND-type control valve as claimed in caim 3, wherein said first and second bores are co-axial.

7. The AND-type control valve as claimed in claim 2, wherein said first and second pistons each include an outer surface, said first orifice being formed along the outer surface of said first piston, and said second orifice being formed along the outer surface of said second piston.

8. The AND-type control valve as claimed in claim 7, wherein said first and second orifices are grooves.

9. The AND-type control valve as claimed in claim 1, wherein said first piston means includes a first cylindrical member having said first orifice formed therein to enable passage of a small flow of fluid, said second piston means including a second cylindrical member and having said second orifice formed therein to enable passage of a small flow of fluid.

10. The AND-type control valve as claimed in claim 9, wherein said first and second cylindrical members each include an outer surface, said first orifice including a first groove formed along the outer surface of said first cylindrical member, and said second orifice including a second groove formed along the outer surface of said second cylindrical member.

11. The AND-type control valve as claimed in claim 10, wherein said first and second cylindrical members each include a longitudinal axis, said first and second grooves each extending in a substantially straight line substantially parallel to the respective longitudinal axis of said first and second cylindrical members.

12. A dual circuit vehicle braking system for a tractor/trailer-type vehicle which includes a tractor and a trailer, said tractor having right-hand and left-hand side brakes and si trailer including brakes, said system controlling the right-hand side and left-hand side brakes in the tractor and the brakes in the trailer, comprising a first hydraulic circuit for controlling the left-hand side brakes and a second hydraulic circuit for controlling the right-hand side brakes of the tractor; an AND-type control valve including a housing having an outlet port formed therein, said housing including a first input flowpath coupled to said first hydraulic circuit and coupled for fluid communication with said outlet port, a second input flowpath coupled to said second hydraulic circuit and coupled for fluid communication with sd outlet port, said outlet port being in fluid communication with at least one of said first and second hydraulic circuits only when both of said first and second hydraulic circuits are pressurized, a first non-return valve having a portion displaceable in said first input flowpath between open and closed positions, said first non-return valve including first flow sensitive means for assisting in displacing said portion of said first non-return valve to said closed position thereof, a second non-return valve having a portion displaceable in said second input flowpath between open and closed positions, said second non-return valve including second flow sensitive means for assisting in displacing said portion of said second non-return valve to said closed position thereof, said first non-return valve and said second non-return valve being operatively arranged such that both respective portions thereof cannot be displaced to their respective closed positions substantially simultaneously; and a trailer brake valve coupled to said outlet port of said AND-type control valve, said trailer brake valve being responsive to fluid communication from said outlet port of said AND-type control valve.

13. The dual circuit vehicle braking system as claimed in claim 12, wherein said first input flowpath includes a first bore therein, said first flow sensitive means including a first piston positioned for reciprocal movement within said first bore, said second input flowpath including a second bore therein, said second flow sensitive means including a second piston positioned for reciprocal movement within said second bore, said first piston having a first orifice defining a restricted flowpath therethrough, said first non-return valve being responsive to travel of said first piston, and said second piston having a second orifice defining a restricted flowpath therethrough, said second non-return valve being responsive to travel of said second piston.

14. The dual circuit vehicle braking system as claimed in claim 13, wherein said first non-return valve includes a first valve element formed integrally with said first piston and positioned in said first bore, said first bore including a first valve seat therein concentric with said first bore and associated with said first valve element, and said second non-return valve including a second valve element formed integrally with said second piston and positioned in said second bore, said second bore including a second valve seat therein concentric with said second bore and associated with said second valve element.

15. The dual circuit vehicle braking system as claimed in claim 14, wherein said first and second non-return valves are poppet-type non-return valves.

16. The dual circuit vehicle braking system as claimed in claim 15, wherein said first and second pistons are disposed downstream, respectively, of said first and second non-return valves, said first and second pistons being opposed and in abutting engagement so that when one of said first and second non-return valves is closed, the other of said first and second non-return valves is at least partially open.

17. The AND-type control valve as claimed in claim 14, wherein said first and second bores are co-axial.

18. The dual circuit vehicle braking system as claimed in claim 15, wherein said first and second pistons each include an outer surface, said first orifice being formed along the outer surface of said first piston, and said second orifice being formed along the outer surface of said second piston.

19. The dual circuit vehicle braking system as claimed in claim 18, wherein said first and second orifices are grooves.

20. The dual circuit vehicle braking system as claimed in claim 12, wherein said first flow sensitive means includes a first cylindrical member having a first orifice formed therein to enable passage of a small flow of fluid, said second flow sensitive means including a second cylindrical member and having a second orifice formed therein to enable passage of a small flow of fluid.

21. The dual circuit vehicle braking system as claimed in claim 20, wherein said first and second cylindrical members each include an outer surface, said first orifice including a first groove formed along the outer surface of said first cylindrical member, and said second orifice including a second groove formed along the outer surface of said second cylindrical member.

22. The dual circuit vehicle braking system as claimed in claim 21, wherein said first and second cylindrical members each include a longitudinal axis, said first and second grooves each extending in a substantially straight line substantially parallel to the respective longitudinal axis of said first and second cylindrical members.

* * * * *